INVENTORS
David Thompson, Jr.
Delbert P. Fisher
BY
Donald P. Selwocki
THEIR ATTORNEY INVENTORS
David Thompson, Jr.
Delbert P. Fisher
BY
Donald P. Selwicki
THEIR ATTORNEY 3,334,710
DIRECT ACTING SELF-ADJUSTING BRAKE MECHANISM
David Thompson, Jr., Detroit, and Delbert P. Fisher, Birmingham, Mich., assignors to General Motors Corporation, Detroit, Mich., a corporation of Delaware
Filed June 28, 1965, Ser. No. 467,632
5 Claims. (Cl. 188—79.5)

ABSTRACT OF THE DISCLOSURE

In a preferred form, this invention relates to an automatic brake adjuster utilizing a fixed reference point for measuring the amount of brake lining wear. An adjusting lever pivoted on the brake shoe has a pawl engaging a star wheel rotatable in a fixed member of the brake, the lever having a link connected to the star wheel to actuate the pawl.

---

This invention relates to braking mechanisms and more particularly to an automatic brake adjuster.

It is desirable in braking systems employing brake shoes drivable into frictional engagement with a rotatable drum to maintain a predetermined clearance between the brake shoes and the brake drum as lining wears. Mechanism for accomplishing this task is present in the prior art and is very often involved in nature and, consequently, expensive to manufacture. In addition, many adjusters utilize servo action generated during brake actuation to pivot a lever which in turn causes a brake adjustment. In many heavy duty vehicles, for example trucks, it is desirable to use dual hydraulic wheel cylinders. In this case, servo action is diminished somewhat and many adjusters of common design would be inoperative therewith. Also, when using duel wheel cylinders, a necessity arises for adjustment of two brake shoes. Many common automatic adjusters are expensive when used to adjust two shoes but would be inordinately expensive if duplicated in a braking system for adjusting individual shoes.

It is an object of the present invention to provide an improved automatic brake adjuster utilizing brake shoe movement toward a rotatable drum to generate the force necessary to automatically adjust a brake shoe.

It is another object of the present invention to provide an improved automatic braking adjusters that is economical to manufacture and, therefore, is suited for adjusting separate brake shoes on a given brake.

It is still another object of the present invention to provide an improved automatic brake adjuster which adjusts the brake on the return motion of the brake shoes and, consequently, has little tendency to over-adjust.

Further objects and advantages of the present invention will be apparent from the following description, reference being had to the accompanying drawings wherein a preferred embodiment of the present invention is clearly shown.

Figure 1:
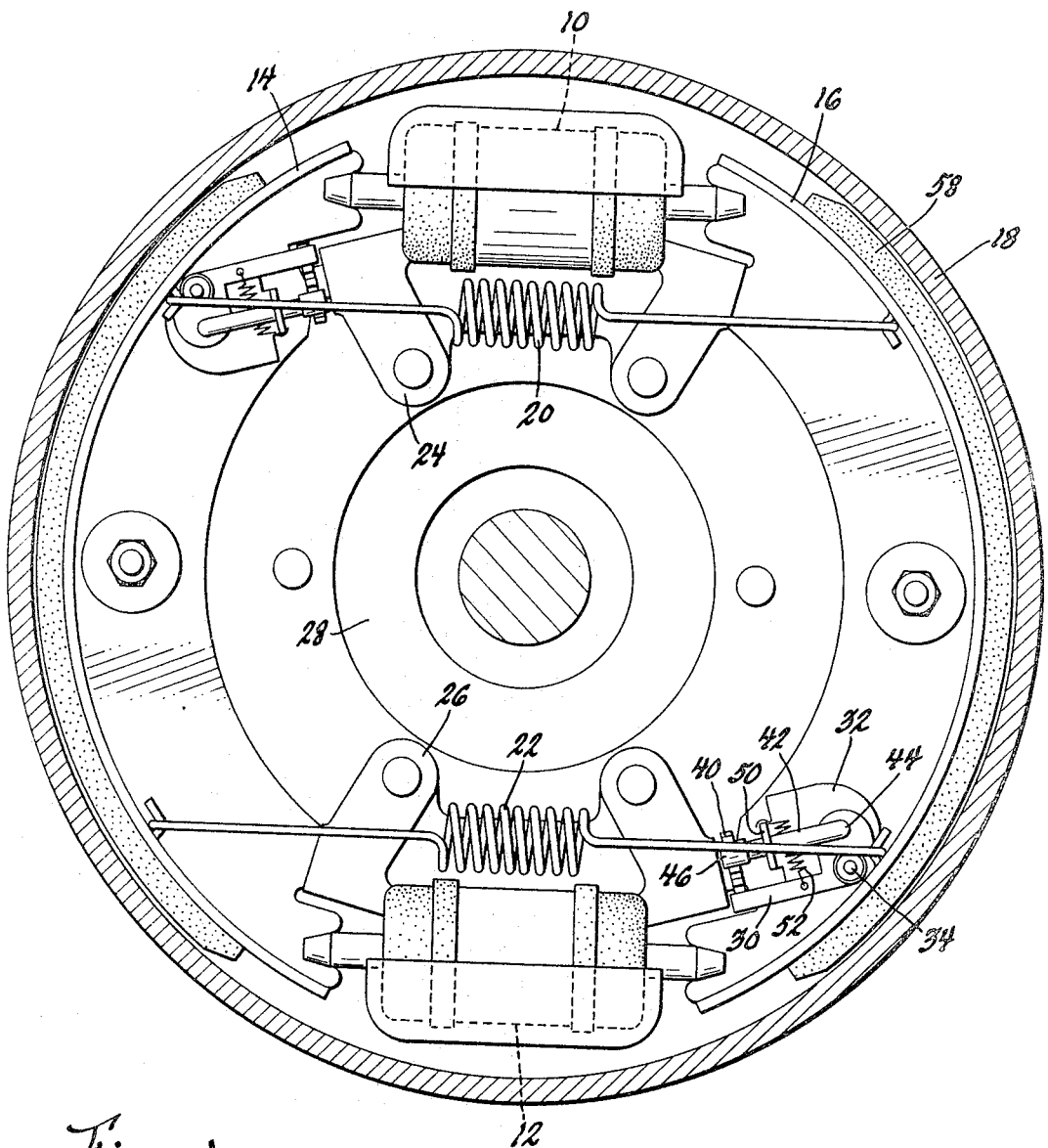
FIGURE 1 is a sectional view of a dual wheel cylinder type wheel brake with the subject invention shown in its operative environment.

Referring to FIGURE 1, a pair of wheel cylinders 10 and 12 operate simultaneously to drive brake shoes 14 and 16 into frictional engagement with a rotatable drum 18. Return springs 20 and 22 each have ends engaging shoes 14 and 16. Mounting brackets 24 and 26 engage an axle flange 28 and serve as anchoring means for shoes 14 and 16. It should be noted that cylinders 10 and 12, brackets 24 and 26, and flange 28 are relatively fixed with respect to rotatable drum 18 and movable shoes 14 and 16. Brackets 24 and 26 are identical and carry identical adjusters such as the one shown in FIGURE 2. The description herein is limited to the adjuster shown on bracket 26.

Figure 2:
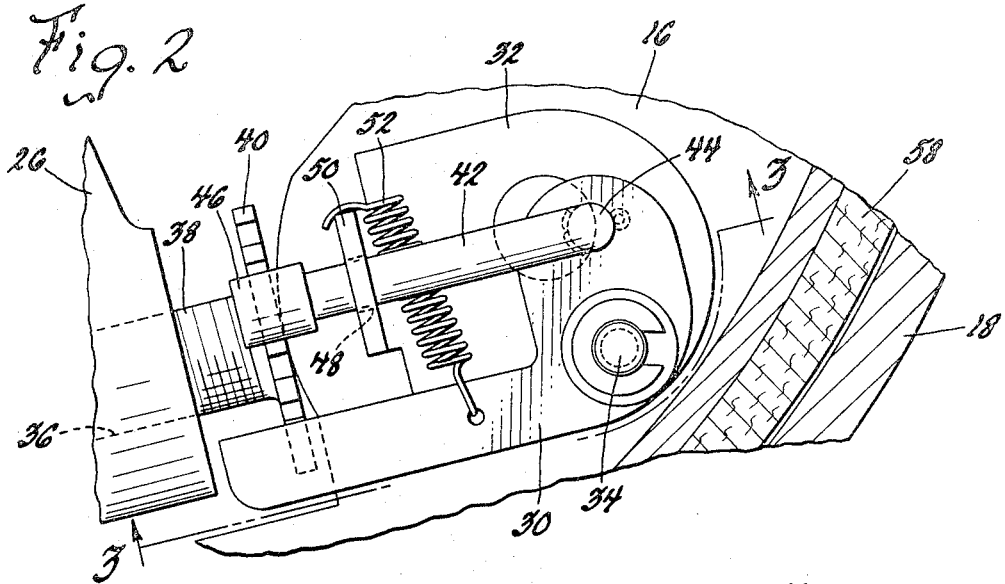
FIGURE 2 is an enlarged elevational view of the subject invention shown in the poised position.

Referring to FIGURE 2, a lever 30 is pivotally supported on mounting bracket 32 fixed to the web of shoe 16. Lever 30 is pivotable about pivot 34 carried by bracket 32. Sleeve 36 integrally formed with bracket 26 cooperates with threaded portion 38 integrally formed with star wheel 40. Sleeve 36, as shown in the preferred embodiment in FIGURE 2, is merely a tapped aperture in bracket 26 although it is clear that it could take the form of a sleeve separate from bracket 26, the only requirement being that sleeve 36 be fixed with respect to shoe 16. Rotation of star wheel 40 in a given direction causes threaded portion 38 to draw out of sleeve 36 and, therefore, sleeve 36, portion 38 and star wheel 40 are herein referred to as expansion means.

Figure 3:
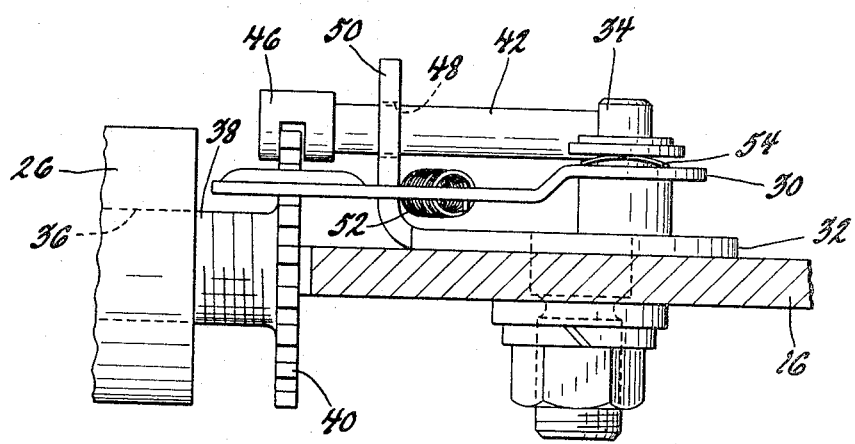
FIGURE 3 is a sectional view of the subject invention taken along line 3—3 of FIGURE 2.

Link 42, better seen in FIGURE 3, is pivotable on pin portion 44 and engages lever 30. Link 42 has a caliper shaped end 46 peripherally engaging star wheel 40. Aperture 48 in an upstanding portion 50 of bracket 32 serves to hold link 42 in its operative position. Spring 52, as seen in FIGURE 2, engages lever 30 and portion 50 to bias lever 30 into engagement with star wheel 40. Spring member 54 biases lever 30 toward star wheel 40. It is therefore seen that pivotal movement of lever 30, as viewed in FIGURE 2 and FIGURE 4, in its completed state will result in lever 30 following the periphery of star wheel 40 while resting against the teeth thereof when pivoted against the force of spring 52.

Figure 4:
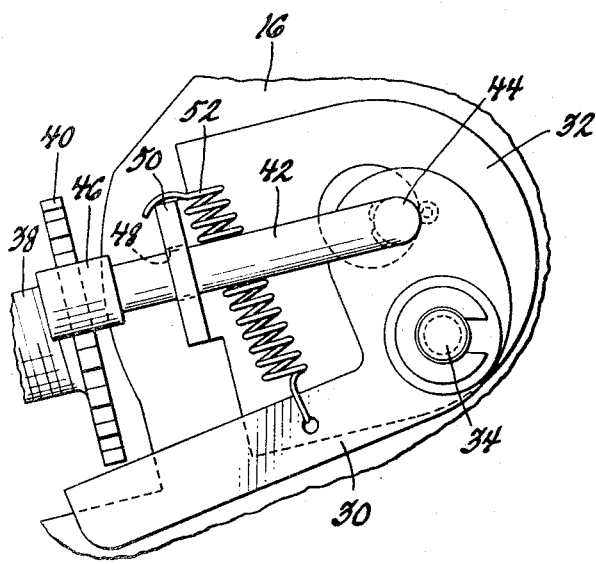
FIGURE 4 is an elevational view of the subject invention in the configuration it assumes during brake actuation.

In operation, referring to FIGURE 1, a force is exerted in any well-known fashion in cylinders 10 and 12. Shoes 14 and 16 are thereby driven into frictional engagement with rotatable drum 18. Referring to FIGURE 2, movement of shoe 16 toward drum 18 results in pivot 34 following this movement. The upper end of lever 30 is restrained from movement by the engagement of link 42 with star wheel 40 and pin 44. Therefore, lever 30 is pivoted away from star wheel 40 during a brake actuation into configuration similar to that seen in FIGURE 4. It should be noted that FIGURE 4 illustrates a configuration wherein sufficient movement of shoe 16 has taken place to cause lever 30 to engage another tooth on star wheel 40. This extra movement is made possible by wear occurring on lining 58 carried by shoe 16.

When pressure is relieved in cylinders 10 and 12, return springs 20 and 22 pull shoe 16 back toward a position of rest toward the configuration shown in FIGURE 2. The combined force of return springs 20 and 22, and spring 52 draw lever 30 in a clockwise manner, as viewed in FIGURE 2, resulting in rotation of star wheel 40. Rotation of star wheel 40, as viewed in FIGURE 2, causes an increase in distance between star wheel 40 and bracket 26 resulting in a repositioning of pin 44. Thereafter, in future brake application, lever 30 will pivot about pin 44 as newly positioned and a brake adjustment has taken place. It should be understood that, if movement of lining 58 is not of sufficient magnitude to pivot lever 30 sufficiently around star wheel 40 to engage a new tooth, no adjustment will take place. Therefore, as determined in design, a certain relationship is set up between the desired distance of travel of shoe 16 with the spacing of the teeth on star wheel 40 and the number of threads per inch on portion 38. A variance in any of these factors causes a difference in response rate of the brake adjusting.

It is important to note that the brake adjusting described herein takes place on return movement of the shoes from an actuated position and, therefore, is accomplished by spring tension and not by direct force transmission which would be the case if adjusting took place during the actuating movement of the brake shoes. Therefore, it is relatively easy to adjust the force of spring 52 to bring about the exact response rate desired for the subject mechanism. It is also possible to adjust the size of aperture 48 to allow link 42 to have a certain amount of lost motion relative to upstanding portion 50 likewise causing a change in the response rate of the subject mechanism. The amount of lost motion allowed link 42, however, is governed to a great degree by the design of caliper 46 so as to prevent disengagement thereof from star wheel 40.

The subject device has particular utility on vehicle brakes utilizing dual wheel cylinders. This is true because a very positive brake adjustment takes place on each shoe where the subject mechanism is carried and, therefore, very fine adjustments can be made to take place keeping a desired clearance between brake shoes and brake drums relatively constant. Likewise, the design of the subject mechanism is such that inexpensive stampings can be used for the components, thereby drastically reducing the cost of manufacture coupled with a lack of need for closeness of dimensional tolerances.

While the embodiment of the present invention, as herein disclosed, constitutes a preferred form, it is to be understood that other forms might be adopted.

What is claimed is as follows:

1. Brake shoe adjusting mechanism comprising: lever means pivotally supported on a brake shoe and arranged to pivot thereon as the shoe moves during brake actuation; expansion means including a star wheel actuator supported on a fixed portion of a vehicle and adapted to be rotatably driven by said lever means into an expanded disposition relative to the fixed portion of the vehicle; and link means engaging said star wheel and pivotally carried by said lever means for maintaining a fixed relationship between said star wheel and said link means as brake lining wear occurs after repeated brake actuation, said link means pivoting an end of said lever means relative to said star wheel during a brake actuation if wear on linings exceeds predetermined limits thereby maintaining a fixed distance between said brake shoe and said star wheel.

2. Brake shoe adjusting mechanism according to claim 1 wherein said expansion means is a fixed threaded sleeve member and an integral threaded shaft and star wheel cooperating with said sleeve member, said star wheel being rotatable by said lever means to cause a repositioning of the poised position of the brake shoe.

3. Brake adjusting mechanism for a vehicle brake shoe movable into frictional engagement with a rotatable drum, said mechanism comprising: a lever pivotally supported by a brake shoe and shitfable therewith during an actuating movement of the brake shoe; a threaded sleeve carried by a fixed portion of the vehicle; a star wheel engaged by said lever and having a threaded element arranged to cooperate with said threaded sleeve to vary the position of said star wheel relative to said threaded sleeve; a link pivotally carried by said lever and having a portion engaging said star wheel in caliper fashion; and spring means resisting pivoting movement of said lever and biasing said lever against the periphery of said star wheel, said lever being restrained by said link and pivotable during an actuating movement of the brake shoe against the force of said spring means away from said star wheel, said spring means arranged to reposition said lever upon brake release against said star wheel thereby turning said star wheel and establishing a new base position for said link if shoe movement due to lining wear exceeds a predetermined limit.

4. Brake adjusting mechanism according to claim 3 wherein said lever is a bell crank.

5. Brake adjusting mechanism according to claim 3 wherein a portion extends from the brake shoe and includes an aperture for positioning said link as said link remains stationary during rotation of said star wheel.

References Cited
UNITED STATES PATENTS

| | | | |
|---|---|---|---|
| 2,002,139 | 5/1935 | DesRosiers | 188—79.5 |
| 2,570,398 | 10/1951 | Smith | 188—79.5 |
| 3,126,074 | 3/1964 | Swift | 188—79.5 |

DUANE A. REGER, *Primary Examiner.*